United States Patent [19]

Pitchenik

[11] Patent Number: 4,796,193
[45] Date of Patent: Jan. 3, 1989

[54] POSTAGE PAYMENT SYSTEM WHERE ACCOUNTING FOR POSTAGE PAYMENT OCCURS AT A TIME SUBSEQUENT TO THE PRINTING OF THE POSTAGE AND EMPLOYING A VISUAL MARKING IMPRINTED ON THE MAILPIECE TO SHOW THAT ACCOUNTING HAS OCCURRED

[75] Inventor: David E. Pitchenik, Fairfield, Conn.

[73] Assignee: Pitney Bowes Inc., Stamford, Conn.

[21] Appl. No.: 882,805

[22] Filed: Jul. 7, 1986

[51] Int. Cl.⁴ .............................................. G06F 15/20
[52] U.S. Cl. ................................ 364/464.02; 235/375
[58] Field of Search .................. 380/23; 364/464, 466; 235/375, 378

[56] References Cited

U.S. PATENT DOCUMENTS

| | | | |
|---|---|---|---|
| Re. 31,875 | 4/1985 | Check, Jr. et al. | 364/900 |
| 3,978,457 | 8/1976 | Check, Jr. et al. | 364/200 |
| 4,241,994 | 12/1980 | Ryan, Jr. | 355/40 X |
| 4,249,180 | 2/1981 | Eberle et al. | 380/37 |
| 4,253,158 | 2/1981 | McFiggans | 364/900 |
| 4,301,507 | 11/1981 | Soderberg et al. | 364/900 X |
| 4,334,771 | 6/1982 | Ryan, Jr. | 355/40 X |
| 4,376,299 | 3/1983 | Rivest | 364/900 |
| 4,447,890 | 5/1984 | Duwel et al. | 364/900 |
| 4,458,109 | 7/1984 | Mueller-Schloer | 380/30 |
| 4,511,793 | 4/1985 | Racanelli | 235/375 |
| 4,637,051 | 1/1987 | Clark | 382/1 |
| 4,641,346 | 2/1987 | Clark et al. | 380/3 |
| 4,641,347 | 2/1987 | Clark et al. | 380/3 |
| 4,649,266 | 3/1987 | Eckert | 235/432 |
| 4,660,221 | 4/1987 | Dlugos | 380/23 |
| 4,757,537 | 7/1988 | Edelmann et al. | 380/23 X |

*Primary Examiner*—Parshotam S. Lall
*Assistant Examiner*—Edward R. Cosimano
*Attorney, Agent, or Firm*—Robert H. Whisker; Melvin J. Scolnick; David E. Pitchenik

[57] ABSTRACT

A system for maintaining the security of user postal funding charges and allowing accurate accounting of delivery charges includes the step of and apparatus for printing on a mailpiece or type at the originating station value to cover delivery charges along with encrypted validation information which is later employed to account for postage funds, particularly at the time of delivery. A visual marking is imprinted on the mailpiece at the time of accounting to show that accounting has occurred. The mail deliverer can rely on the visual indication for assurance that processing and accounting has occurred.

12 Claims, 4 Drawing Sheets

POSTAGE PAYMENT SYSTEM WHERE ACCOUNTING FOR POSTAGE PAYMENT OCCURS AT A TIME SUBSEQUENT TO THE PRINTING OF THE POSTAGE AND EMPLOYING A VISUAL MARKING IMPRINTED ON THE MAILPIECE TO SHOW THAT ACCOUNTING HAS OCCURRED

FIELD OF THE INVENTION

The present invention relates to postage payment systems are more particularly to postage payment systems where accounting for postage payment occurs at a time subsequent to the printing of the postage. The system imprints on the mailpiece a visual marking to show that accounting has occurred.

BACKGROUND OF THE INVENTION

Postage meters are mass produced devices for printing a defined unit value for governmental or private carrier delivery of parcels and envelopes. The term "postage meter" also includes other like devices which provide unit value printing such as "tax stamp meters". Postage meters conventionally include internal accounting devices which account for postage value representation which is stored within the meter and is printed by the meter. As a result, postage meters must possess a high degree of reliability to avoid the loss of user or governmental funds stored within the meter.

Electronic postage meters have been developed. Postage meter systems of this type are disclosed in U.S. Pat. Nos. 3,978,457 for Microcomputerized Electronic Postage Meter System; and in 4,301,507 for Electronic Postage Meter Having Plural Computing Systems. Such meters may have electronic accounting circuits which include non-volatile memory capability for storing postage accounting information. The memory functions in these electronic accounting circuits have replaced the function served in mechanical postage meters by mechanical accounting registers.

Systems have been developed where encryption is employed in the imprinting of postage such as is disclosed in U.S. patent application Ser. No. 724,372, filed Apr. 17, 1985 for George B. Edelmann and Arno Muller and entitled "System for Detecting Unaccounted for Printing in a Value Printing System" and is a continuation in part U.S. patent application Ser. No. 832,904 filed Feb. 25, 1986 for George B. Edelmann, Arno Muller, Alfred Schmidt and Kevin Hunter and also entitled "System for Detecting Unaccounted for Printing in a Value Printing System." These systems involve the printing of encrypted information on a mailpiece to provide an indication of the validity of the imprint on the mailpiece. These systems employ accounting circuitry which is resident in the meter at the user location.

A system is disclosed in U.S. patent application Ser. No. 882,871, filed concurrently herewith, for Wojciech M. Chrosny and entitled "Postage Payment System Employing Encryption Techniques and Accounting for Postage Payment at a Time Subsequent to the Printing of the Postage." This system discloses the basic concept of accounting for postage at a time subsequent to the printing of postage and a system wherein no secure postage accounting takes place and no postage funds are stored within the meter at the postage user location.

SUMMARY OF THE INVENTION

It has been discovered that a system can be provided to maintain the security of user postal funding charges and to allow accurate accounting for delivery charges to be provided to a user. In accordance with the invention, there is printed on a mailpiece or a tape at the originating station value to cover delivery charges for the mailpiece along with encrypted validation indicators which are machine readable and may be later employed, to account for postage funds, in particular, at the time of delivery. Central to the system is the printing at the time of accounting, wherever it may take place, a visual marking which is imprinted on the mailpiece to show that accounting has occurred. In this way, the mail carrier or other individual responsible for the delivery of the mailpiece can rely upon a visual indication that the item to be delivered has been processed by the accounting system and postage accounting has occurred. Where in accordance with the invention, a visual mark is placed on the mailpiece to indicate accounting has occurred, a system is facilitated where many printing devices can print an indicia without the need for either a secure or non-secure accounting device. Postage accounting can then be accomplished at a later time by the postal authorities or others. Such others may include a third-party accounting service which accounts and prints the visual mark on the mailpiece or the mailer himself who printed the original postage. Under these circumstances the third-party or the mailer may be bonded if desired. Moreover, separating the postage printing in this manner and using a visual marking when accounting occurs allows the use of very high speed equipment to print the postage and later to account for and mark the mailpiece.

A system employing the present invention includes a computer; a postage validating device coupled to the computer for providing postage validating information; a printer coupled to said computer, said printer receiving therefrom postage value and user account information for printing on a mailpiece, said computer providing the postal value printed on a mailpiece but not accounting for such value at the time of postage printing, a reader for reading validating data from said mailpiece; accounting means coupled to said reading means; and means coupled to said accounting means for imprinting a mark on the mailpiece at a time of accounting processing to provide a visual indication that accounting for the mailpiece has occurred. There is also described a mailpiece having a postage imprint thereon comprising plain text information, encrypted information and a visual indication indicating that mail accounting has occurred for accounting for the printed postage value.

BRIEF DESCRIPTION OF THE DRAWINGS

A complete understanding of the present invention may be obtained from the following detailed description of the preferred embodiment thereof, when taken in conjunction with the accompanying drawings, wherein like reference numerals designate similar elements in the various figures, and in which.

DESCRIPTION OF THE PREFERRED EMBODIMENT

Figure 1:
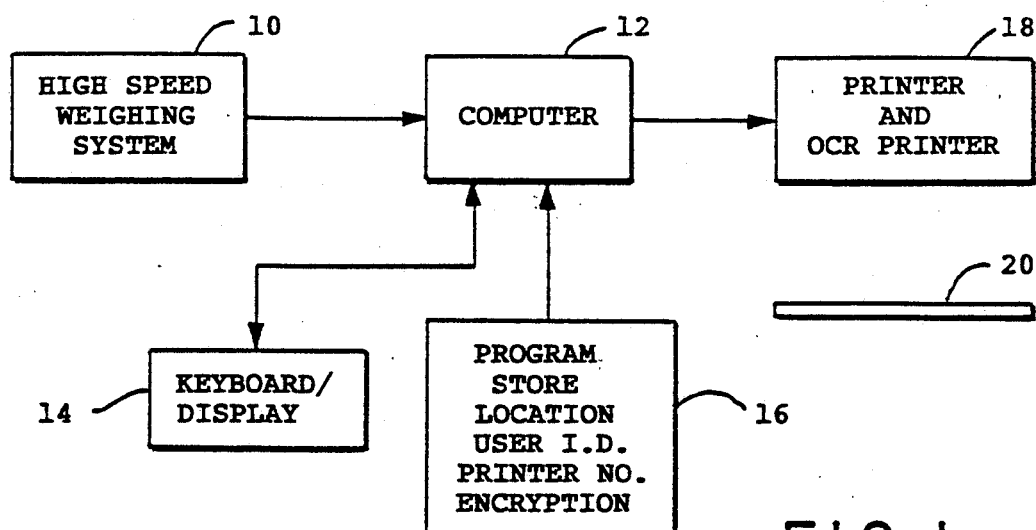
FIG. 1 is a block diagram of a mail originating station at a mailer or user location.

Reference is now made to FIG. 1. In the system, in accordance with the preferred embodiment of the invention, the mail originating station includes a high speed Wang System weighing device 10 coupled to a user computer 12. Also coupled to the computer 12 is a keyboard display 14 and a program store 16. The program store includes information such as user location, user I.D., printer number, etc. and encryption information. Also coupled to the user computer 12 is a printer and an optional optical character printer such as a bar code printer or the like 18. The printer under control of the computer 12 prints alpha-numeric information from the computer 12 on the mailpiece 20 (FIG. 5) both in clear text and encrypted form for validation. The information includes the postal value for delivery of the mailpiece 20 along with the account to be charged for the delivery. The optional OCR printer prints similar information in easily machine readable form such as, for example, bar code format.

Figure 2:
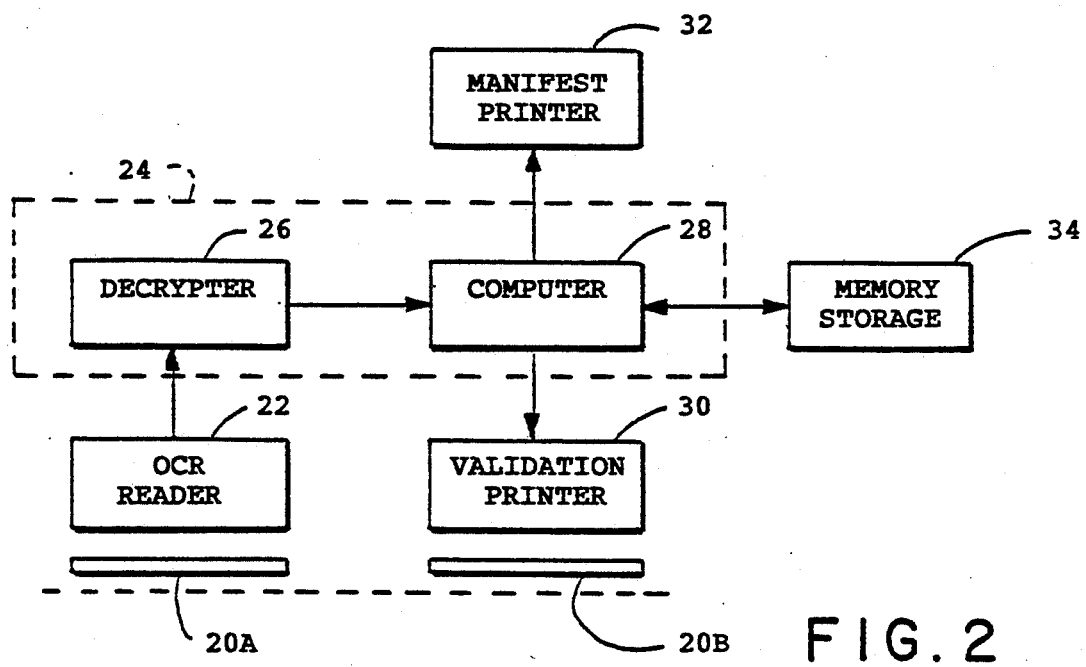
FIG. 2 is a mail accounting station at a post office or other facility.

Referring now to FIG. 2, a mail accounting station, which can be located in the user facility, a third-party facility or the postal accounting facility includes an OCR reader 22 coupled to a unit 24 which includes a decrypter 26 coupled to the mail accounting station computer 28. In the instant system the disassembled encrypted information provides the user identification or charge number employed in accounting process to the mail accounting station computer.

The mail accounting computer drives both a validation printer 30 and a manifest printer 32. When the information on the mailpiece 20A has been read and decrypted, the information is processed, the computer commands the validation printer to print a visual indication on the mailpiece 20B to indicate that accounting has occurred. The computer stores the accounting information in the memory store 34. The manifest printer under control of the computer prints the suitable manifesting information to manifest the mail and to print the appropriate user billing information.

It will be appreciated that the point in the delivery system where accounting is achieved is variable and can be accomplished at various points as desired. These points include, but are not limited to accounting by the mailer himself, by the postal activities or by a third-party. If desired, the user and third-party may be bonded to insure faithful accounting for all mail. In accordance with the invention, at the time of processing the mailpiece 20, 20A, 20B for accounting purposes, a visual indicator is imprinted on the mailpiece 20 to indicate that accounting has occurred.

The delivery charge and encrypted validation indicator are read after the mailpiece 20 has been printed and is not accounted for at the time of printing as in the current postage meters. The reading and accounting for each user may be accomplished in several ways and at several points in the mail delivery system, depending upon the system desired. For example, the user, himself can scan and store data with a secure device which prints a validation indicator, for example, a "bugle" (FIG. 5) or other suitable postage imprint or similar mark on the mailpiece 20B. It will be understood that the mark may be a bar code or machine readable indication in place of or in addition to fixed indicator symbol. The validation indicator provides a visual indication that the accounting process has been accomplished. The secure device then either provides a printout (a manifest) which is sent daily or weekly to the postal authorities or is connected via a data link to a central postal charge system.

Alternatively, a bonded, non-governmental, central authority can provide the accounting for the mailpieces 20 put into the delivery stream, with or without the validation imprint. Moreover, the government itself can provide the mail accounting stations to scan the various mailpieces 20A or alternatively may have bundled mail put into the mail stream at a predetermined post office where various pieces of mail can be spot checked. The system provides an advantage for large scale high speed mailing systems where meter setting speed has been a bottleneck. This is because the system is provided where very high speed printing technology can be employed as accounting occurs after printing has been accomplished.

Figure 3:
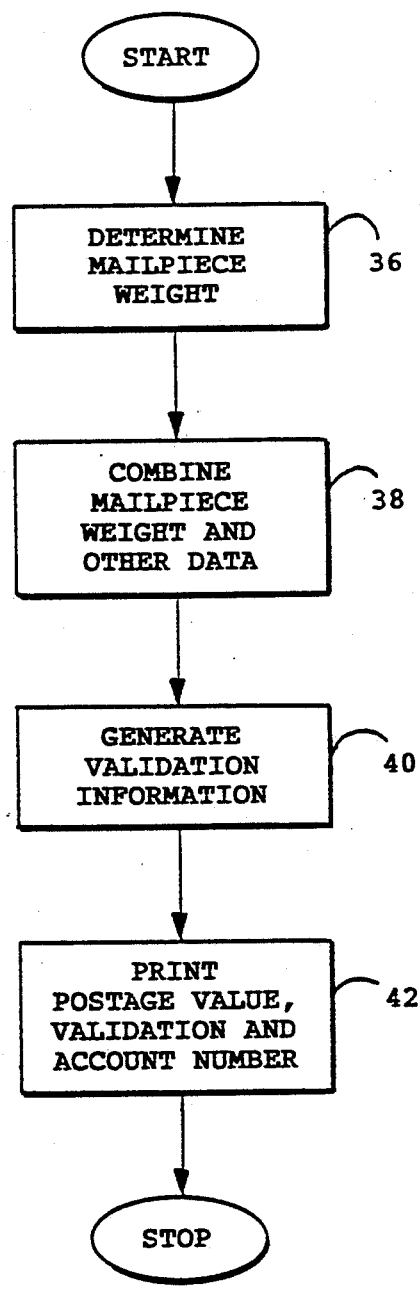
FIG. 3 is a flow chart of the flow of operation of the system shown in FIG. 1.

For better understanding of the process, reference is now made to FIG. 3 which is a flow chart of the system shown in FIG. 1. As a mailpiece enters the originating station, the Wang system determines the mailpiece weight, block 36. The user computer combines the mailpiece weight and other data including a user identification number for accounting purposes and provides postal vaue value charge, if desired, block 38. The system generates validation information for later use, block 40. For best results as described above, the information is printed in plain text and also at least some of the information is encrypted for validation later on. The printer and OCR printer are driven by the computer to print postage value, validation information, and account number on the mailpiece, block 42.

Figure 4:
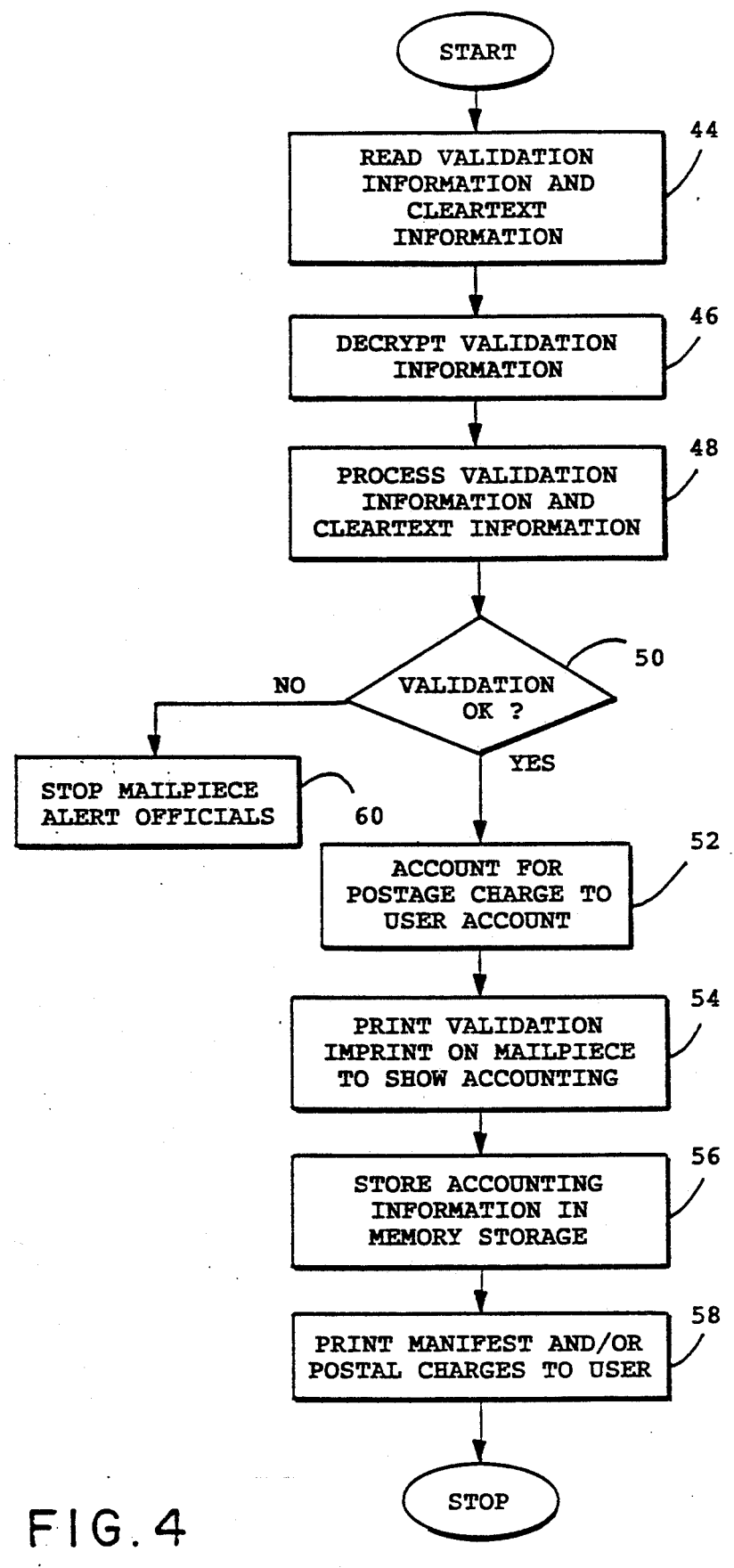
FIG. 4 is a flow chart of the flow of operation of the system shown in FIG. 2.

Referring now to FIG. 4 which is a flow chart of the mail accounting system shown in FIG. 2, the OCR reader reads the validation information and clear text information, block 44. The decrypter 26 thereafter decrypts the validation information, block 46. The computer processes the decrypted information and the clear text information, block 48. If the validation information is determined to be correct at decision block 50, the postage is accounted for and postage is charged to the user account, block 52. If it is determined at decision block 50 that the validation is not okay, the system stops the processing of the mailpiece and alerts officials, block 60. Where the accounting has occurred and has been charged to the user account as in block 52, the validation printer is caused to print a validation imprint on the mailpiece to show that accounting has occurred to providing a visual indication on the mailpiece, block 54. The system thereafter stores the accounting information in the memory storage, block 56. The computer can be selectively operated to drive the manifest printer to print manifesting information to manifest the mail and or postal charges to be sent to the user, block 58.

Figure 5:
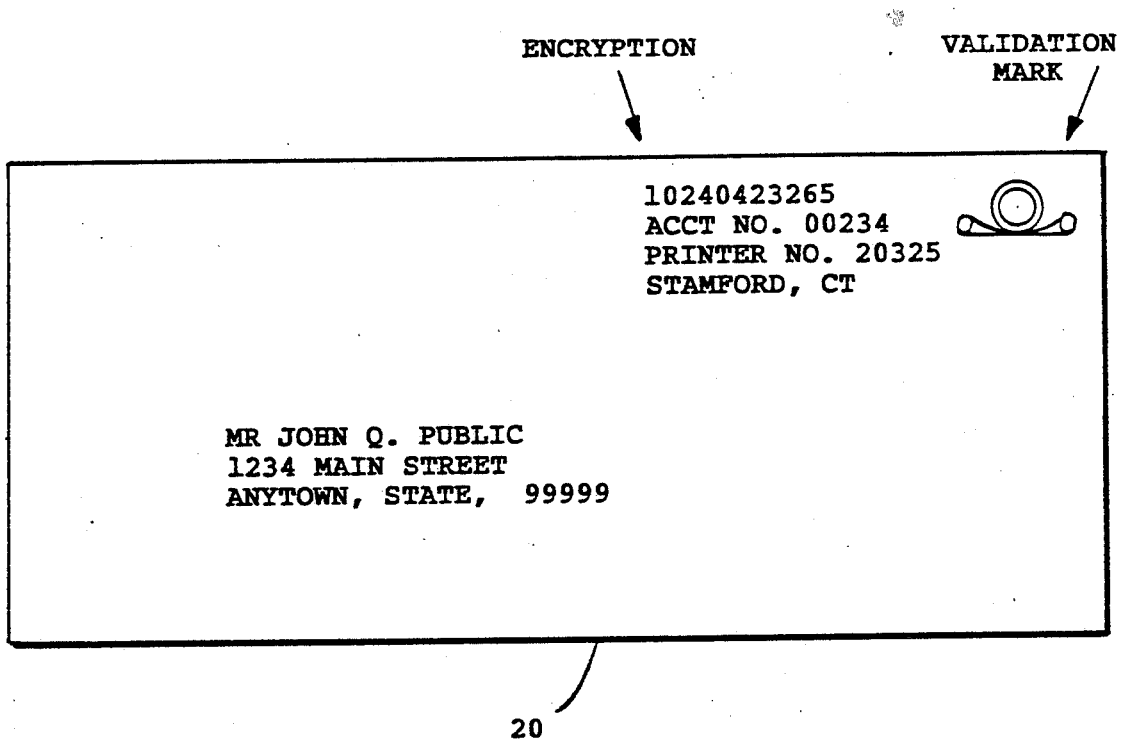
FIG. 5 is an illustration of one embodiment of a mailpiece bearing the mark to provide visual indication of accounting.

FIG. 5 shows a mailpiece 20 having a postage value imprint thereon which comprises plain text information, encrypted information and a visual indication, exemplified by a mark in the form of a bugel, indicating that mail accounting has occurred for the printed postage value.

It will be appreciated that there has now been disclosed a system which both maintains the security of user postal funding charges and allows the government to accurately account for postal funds chargeable to each user for delivery services provided. The system is such that the charges can be made for delivery services actually provided rather than for postage funds printed and in particular provides a visual indication on the mailpiece that accounting for that mailpiece has occurred.

The above described embodiment can be modified in a variety of ways and those modifications will still be within the spirit and scope of applicant's invention. For example, various types of printers can be employed and various OCR devices can be employed. Additionally, the mail accounting and marking station can be located in a number of various locations. Thus, while the invention has been described by means of a specific illustrative embodiment, the principles thereof are capable of a wide range of modification by those skilled in the art within the scope of the following claims.

What is claimed is:

1. A system comprising:
   a computer;
   a postage validating device responsive to said computer for providing postage value and user account information;
   a printer responsive to said computer, said printer receiving from said computer said postage value and user account information for printing on a mailpiece, said computer providing said postage value information to be printed on a mailpiece but not accounting for such value at the time of postage printing;
   a reader for reading validating data from said mailpiece;
   accounting means for account processing, said accounting means responsive to said reading means; and means responsive to said accounting means for imprinting a mark on said mailpiece at a time of account processing to provide a visual indication that accounting for said mailpiece has occurred.

2. The system of claim 1 wherein the postage validation device provides encrypted information to the computer.

3. The system of claim 1, wherein said reader, accounting means and mark imprinting means are remotely located from the remainder of the system.

4. The system according to claim 3 including a second computer, and said reader, accounting means and mark imprinting means responsive to said second computer.

5. The system according to claim 1, wherein said accounting means and mark imprinting means are remotely located from the remainder of the system.

6. The system according to claim 5 including a second computer, and accounting means and mark imprinting means responsive to said second computer.

7. A postage accounting system comprising:
   a computer;
   means responsive to said computer for reading information on a mailpiece;
   means responsive to said computer for processing the information read by said means for reading to verify the validity of said mailpiece and to identify an account to be charged for such mail delivery charges; and
   an accounting data base responsive to said computer for storing said information and identified account as postage accounting information;
   means for account processing; and
   a printer for imprinting a visual indication on the mailpiece at the time of account processing to provide a visual indication that accounting for said mailpiece has occurred.

8. The postage accounting system of claim 7 wherein said means for processing includes decryption means for decrypting encrypted information read from said mailpiece.

9. A method for creating a postage accounted for imprint comprising: processing mail data information to encrypt the information, such encryption including a postage value amount and a user identification number; printing both the encrypted information and clear text information on a mail piece such that the mailpiece can later be scanned to determine the postage amount; scanning the mailpiece and determining the user account number for subsequent charge to a user account; and imprinting a visual indication on the mailpiece at the time of accounting for the postage amount to provide a visual indication that accounting for the mailpiece has occurred.

10. The method according to claim 9 including implementing the processing and printing steps at a first station, and implementing the scanning and imprinting steps at a second station remotely located from the first station.

11. A method for accounting for postage comprising: scanning a mailpiece which includes encrypted and clear text information previously provided at a first station to read from the mailpiece both the encrypted and clear text information, said information including an amount of postage; processing such clear text and encrypted information at a second station remotely located from the first station to determine the validity of the imprint and to determine a mailer's account number; charging the mailer's account at the second station with the amount of postage for subsequent billing; and imprinting at the second station a visual indication on the mailpiece at the time of accounting for postage to provide a visual indication that accounting for the mailpiece postage has occurred.

12. A mailpiece having a postage imprint thereon comprising plain text information, a postage value and encrypted information, and a separate, visual indication indicating that said postage imprint has been scanned, said encrypted information decrypted and said mailpiece verified, and that mail accounting has occurred for accounting for said printed postage value.

* * * * *